(12) United States Patent
Ge

(10) Patent No.: US 8,590,395 B2
(45) Date of Patent: Nov. 26, 2013

(54) FLOW METER WITH SENSOR ELEMENT HAVING A MAGNETIC ELEMENT COUPLED TO AN INDUCTOR ELEMENT

(75) Inventor: Henry Ge, Shenzhen (CN)

(73) Assignee: STMicroelectronics (Shenzhen) R&D Co., Ltd. (CN)

(*) Notice: Subject to any disclaimer, the term of this patent is extended or adjusted under 35 U.S.C. 154(b) by 431 days.

(21) Appl. No.: 12/942,349

(22) Filed: Nov. 9, 2010

(65) Prior Publication Data

US 2011/0154911 A1 Jun. 30, 2011

(30) Foreign Application Priority Data

Dec. 31, 2009 (CN) .......................... 2009 1 0265996

(51) Int. Cl.
*G01F 1/58* (2006.01)
(52) U.S. Cl.
USPC ...................................... 73/861.11
(58) Field of Classification Search
None
See application file for complete search history.

(56) References Cited

U.S. PATENT DOCUMENTS

| 4,463,354 | A | | 7/1984 | Sears |
|---|---|---|---|---|
| 4,838,093 | A | * | 6/1989 | Corser et al. ............... 73/861.53 |
| 5,056,049 | A | * | 10/1991 | O'Neill .......................... 702/55 |
| 5,079,943 | A | * | 1/1992 | Custer ........................... 73/1.16 |
| 5,279,163 | A | * | 1/1994 | D'Antonio et al. ............. 73/728 |
| 5,604,414 | A | | 2/1997 | Milligan et al. |
| 5,750,902 | A | | 5/1998 | Schwiderski |
| 6,668,665 | B2 | * | 12/2003 | Schimnowski et al. .... 73/861.53 |
| 7,444,886 | B2 | * | 11/2008 | Furkert et al. ............. 73/861.53 |
| 2005/0229716 | A1 | * | 10/2005 | Unsworth et al. ......... 73/861.53 |
| 2008/0047359 | A1 | * | 2/2008 | Zheng et al. .............. 73/861.53 |

OTHER PUBLICATIONS

Gomez, Chano, "Why the smart grid must be based on IP standards", DS2 Blog, http://blog.ds2.es/ds2blog/2009/05/why-smart-grid-must-use-ip-standards.html, May 20, 2009.

* cited by examiner

*Primary Examiner* — Harshad R Patel
(74) *Attorney, Agent, or Firm* — Leveque IP Law, P.C.

(57) ABSTRACT

A flow meter for measurement of a metered fluid has a sensor element that receives a flow input of a metered fluid and outputs a flow output of the metered fluid, and a battery element. The sensor element has an inductor element and a magnetic element coupled to the inductor element. In response to movement of the magnetic element relative to the inductor element caused by a fluid pressure differential of the metered fluid, the inductive value of the inductor element changes.

20 Claims, 4 Drawing Sheets

FLOW METER WITH SENSOR ELEMENT HAVING A MAGNETIC ELEMENT COUPLED TO AN INDUCTOR ELEMENT

This application claims the benefit of Chinese Patent Application Ser. No. 200910265996.8 filed on Dec. 31, 2009, entitled "Flow Meter" which is hereby incorporated by reference in its entirety herein.

BACKGROUND

Flow meters are used to measure the consumption of a metered fluid flow, such as the consumption of metered gas and water. So called "smart meters" are additionally able to communicate periodic readings of fluid consumption to a data reader of a network. Such readings must be accurate and transmission of consumption readings need only be performed periodically.

Sensors that have been used to sense and measure liquid flow consumption may be powered continuously, even when measurements need to be taken and reported only periodically, and are often a relatively expensive part of the flow meter. Such sensors are additionally a drain on power and do not take advantage of the standby periods during which measurement and transmission of measurement results are not required.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
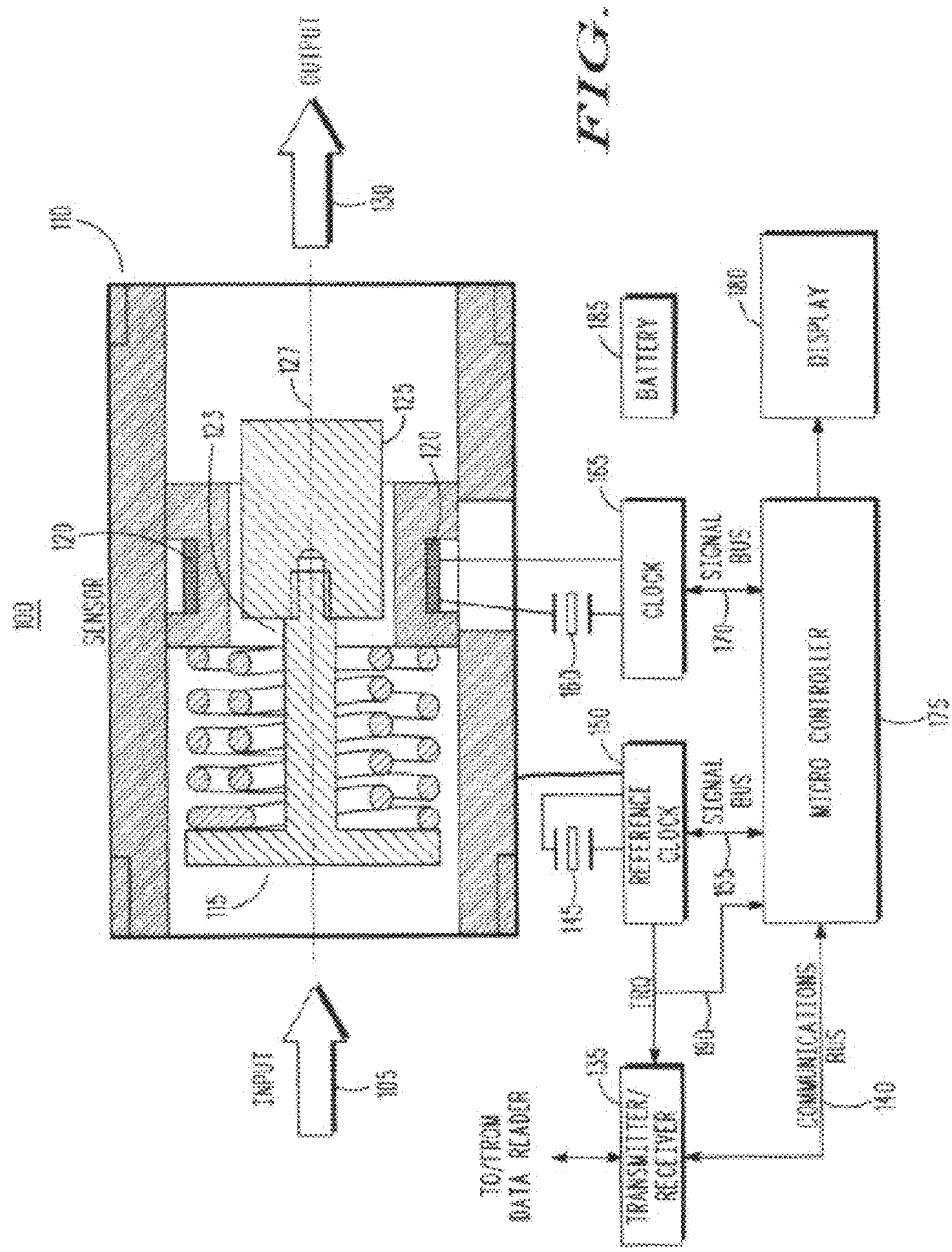
FIG. 1 is a block diagram of a flow meter in accordance with various representative embodiments.

As shown in the drawings for purposes of illustration, novel techniques are disclosed herein for a flow meter and method of flow measurement of a metered fluid, such as gas and water. In a flow meter capable of measuring and communicating the flow of such a fluid, a sensor element receives a flow input of a metered fluid and outputs a flow output of the metered fluid; a battery element powers the flow meter. The sensor element has an inductor element and a magnetic element coupled to the inductor element. In response to movement of the magnetic element relative to the inductor element caused by a fluid pressure differential of the metered fluid, the inductive value of the inductor element of the sensor changes.

As illustrated in connection with certain embodiments, the flow meter further comprises a reference clock element coupled to the sensor element; a clock element coupled to the inductor element; and a controller element coupled to the reference clock element and the clock element. In response to movement of the magnetic element relative to the inductor element caused by a fluid pressure differential of the metered fluid, the inductive value of the inductor element of the sensor changes and also the controller element calculates a changed frequency of the clock element based upon the reference clock element and the changed inductive value of the inductor element caused by movement of the magnetic element relative to the inductor element. The changed frequency of the clock element is representative of a volume of liquid consumption value of the metered fluid measured by the flow meter In accordance with a method of measuring consumption of a metered fluid, a fluid flow of a metered fluid is received at an input side of a magnetic element of a sensor element of a flow meter. The magnetic element moves along an axis of the magnetic element relative to an inductor element of the sensor element in accordance with a fluid pressure differential that exists between the input side and an output side of the magnetic element, thereby changing the inductive value of the inductor element and a frequency of a clock element coupled to the inductive element. The changed frequency of the clock element is calculated based upon a reference clock element and the changed inductive value of the inductor element. A volume of liquid consumption value of the metered fluid measured by the flow meter is determined using the changed frequency of the clock element. This volume of liquid consumption value may then be communicated.

In the following detailed description and in the several figures of the drawings, like elements are identified with like reference numerals.

FIG. 1 is a block diagram of a flow meter 100, in accordance with various embodiments. As shown in the drawing, sensor 110 senses fluid flow when provided with input flow 105 of a fluid and outputs a fluid flow output 130. The fluid may be water, gas, or other fluid whose flow is measurable through the flow meter. The input flow 105 is presented to a mechanical construction of sensor 110, such as rotating fan 115, before flowing to a magnetic element 125 capable of being moved along a longitudinal axis on which it rests when sufficient fluid pressure differential of the metered fluid exists between the input side 123 and the output side 127 of the metered fluid flow on either side of magnetic element 125. Magnetic element 125 rests on its axis between an inductor element 120 as shown and movement of magnetic element along its axis relative to inductor element changes the inductive value of inductor element 120.

The inductive value, in Henries, of inductor element 120 changes when the magnetic cone is moved right or left along its axis. Crystal oscillator 160 is in series with inductor element 120 and clock element 165; the crystal in series with the inductor allows the frequency of the clock element to change as the inductor value changes. Thus, the frequency for clock element 165, normally fixed, changes when the magnetic element moves. The changed frequency of clock element 165 is calculated by the controller element 175 based on the reference clock element 150, the base standard timer. As shown, both reference clock 150 and clock element 165 are coupled to controller element 175 through serial buses 155 and 170, respectively. Reference clock element 150 is coupled to crystal/oscillator element 145.

Thus, in response to movement of the magnetic element 125 relative to the inductor element 120, the inductive value of the inductor element 120 of the sensor changes and prompts controller element 175 to calculate a changed frequency of the clock element 165 based upon the reference clock element 150 and the changed inductive value of the inductor element 120 caused by movement of the magnetic element relative to the inductor element 120. The changed frequency of the clock element 165 is representative of a volume of liquid consumption value of the metered fluid measured by the flow meter. The changed frequency can be converted by the controller element 175 to the liquid consumption value and displayed by display element 180.

The volume of liquid consumption value calculated by the controller element 175 can also be sent out to other measurement equipment. This data is sent by controller element 175 to a transmitter/receiver element 135 via communications bus 140. Transmitter 135 can then transmit the volume of liquid consumption data to an external data reader as needed. For example, an interrupt request signal 190 from reference clock element 150 may prompt the controller 175 to send the liquid consumption value data to transmitter 135 and transmitter 135 to transmit this data. The interrupt request signal 190 may occur automatically at predetermined times or predetermined time intervals, such as serving an auto date wakeup for an automated meter reading (AMR).

The interplay between magnetic element 125 and inductor element 120 in sensor 110 provides a low cost, high performance sensor. Very low power consumption is achieved through "zero power" technology, since there is not the need for ongoing measurement. The battery requirements of element 185 that powers the flow meter are low, with the clock elements having an ongoing power consumption of less than 1 nA, for example, and with the controller element and the transmitter element powering up only when asked to do so by the IRQ of the reference clock element. No expensive sensor is needed for accurate, ongoing liquid consumption measurement. The use of a fluid pressure differential of the metered fluid that exists either side 123, 125 of the magnetic element 125 to move the magnetic element relative to the inductor element 120 results in a changed inductive value of the inductor element 120 that in turn changes the frequency of the clock element 165. This is accomplished without the need for ongoing power consumption. The controller element calculates the changed frequency of the clock element 165 based upon the reference clock element 150 and the changed inductive value of the inductor element 120. As described, the changed frequency of the clock element 175 is representative of a volume of liquid consumption value of the metered fluid measured by the flow meter 100. This information can be transmitted to other measurement equipment external the flow meter by transmitter element 135 as controlled by controller element 175. This may occur in accordance with interrupt request signal 190 of reference clock element 150 which may be generated by reference clock 150 periodically or on another basis. For example, IRQ signal 190 may cause controller element 175 to send out fluid flow consumption data via transmitter element 135 to an external data reader every 24 hours, every week, every month, etc.

Figure 2:
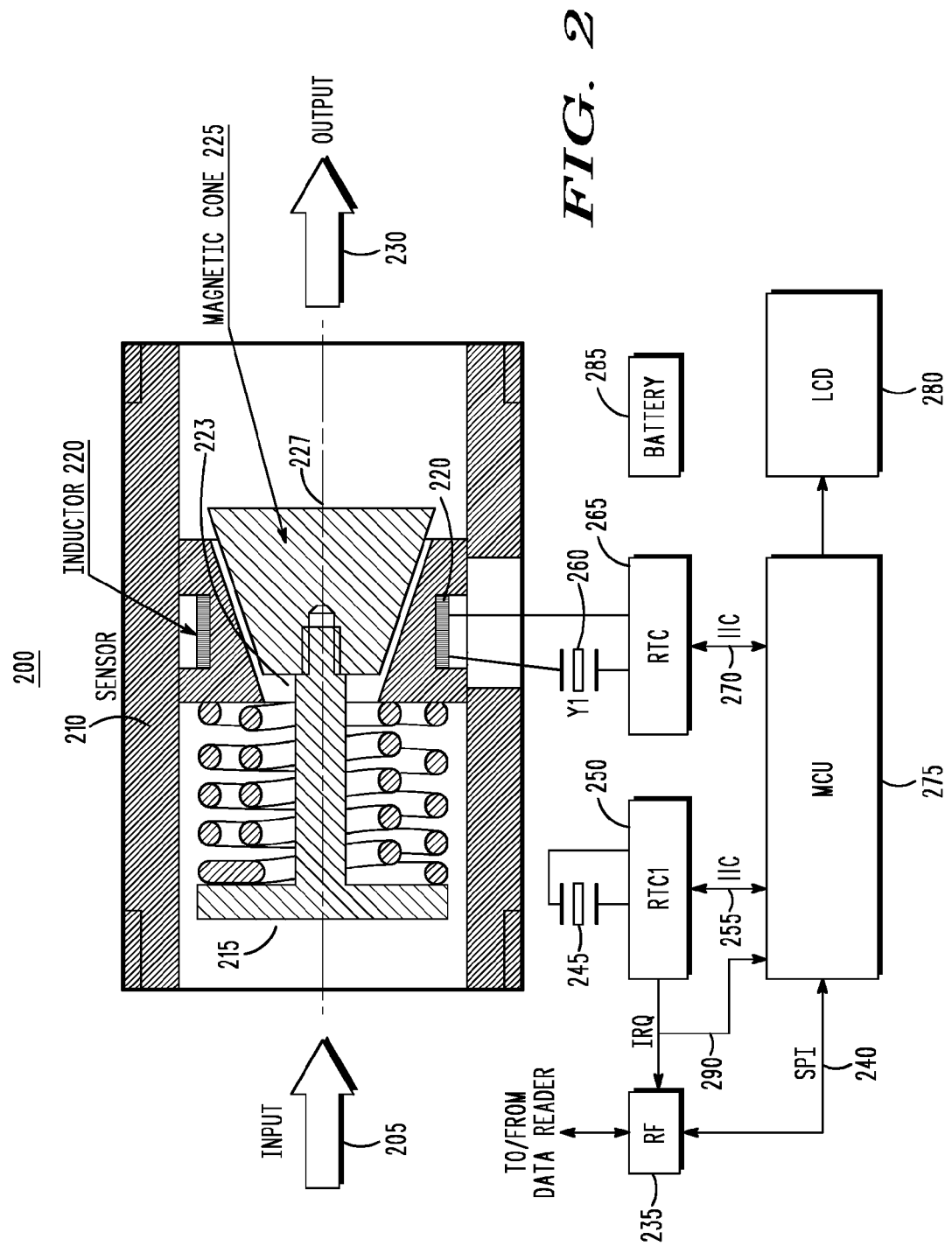
FIG. 2 is a block diagram of a flow meter in accordance with various representative embodiments.

Reference now to block diagram 200 of FIG. 2 illustrates a more particular example of a flow meter for measuring the flow of a metered fluid 105, in accordance with various embodiments. Sensor 210 receives an input fluid flow 205 of a metered fluid, such as gas or water, which is received by rotating fan 215. The fluid passes by magnetic cone 225. The magnetic element is a magnetic cone 225 that is able to slide along its longitudinal axis relative to inductor element 220 when caused to do so by a fluid pressure differential of the metered fluid between the input and output sides 223, 237 of magnetic cone 225. The inductive value of the inductor element 220 of the sensor 210 changes and the controller element, shown here as a microcontroller element or MCU 275, calculates a changed frequency of real time clock (RTC) element 265 based upon the reference real time clock (RTC1) element 250 and the changed inductive value of the inductor element 220. The changed frequency of the RTC clock element 265 is representative of a volume of liquid consumption value of the metered fluid measured by the flow meter. RTC1 element 250 is coupled to crystal/oscillator 245 while RTC element 265 is coupled to crystal/oscillator 260 as shown. A battery element 285 powers the flow meter.

In the particular embodiment of FIG. 2, TCP/IP technology is used to allow communication internal the flow meter and with external measurement equipment outside the flow meter. The serial computer buses 255 and 275 providing communication between RTC1 250, RTC 265 and MCU 275 are inter-integrated circuit (IIC) serial computer busses. MCU communicates with a radio frequency (RF) transmitter/receiver element 235 via a serial peripheral interface (SPI). RF transceiver element 235 is able to send volume of liquid consumption value information to external data readers using a wireless, radio frequency communications link. RF element 235 may be a mobile phone, Bluetooth™ device, or the like. As previously mentioned, the interrupt request signal IRQ 290 may control when MCU 275 controls RF transmitter 235 to send fluid consumption information to an external data reader. Fluid consumption information of the metered fluid is in this embodiment displayed on a liquid crystal display 280.

Figure 3:
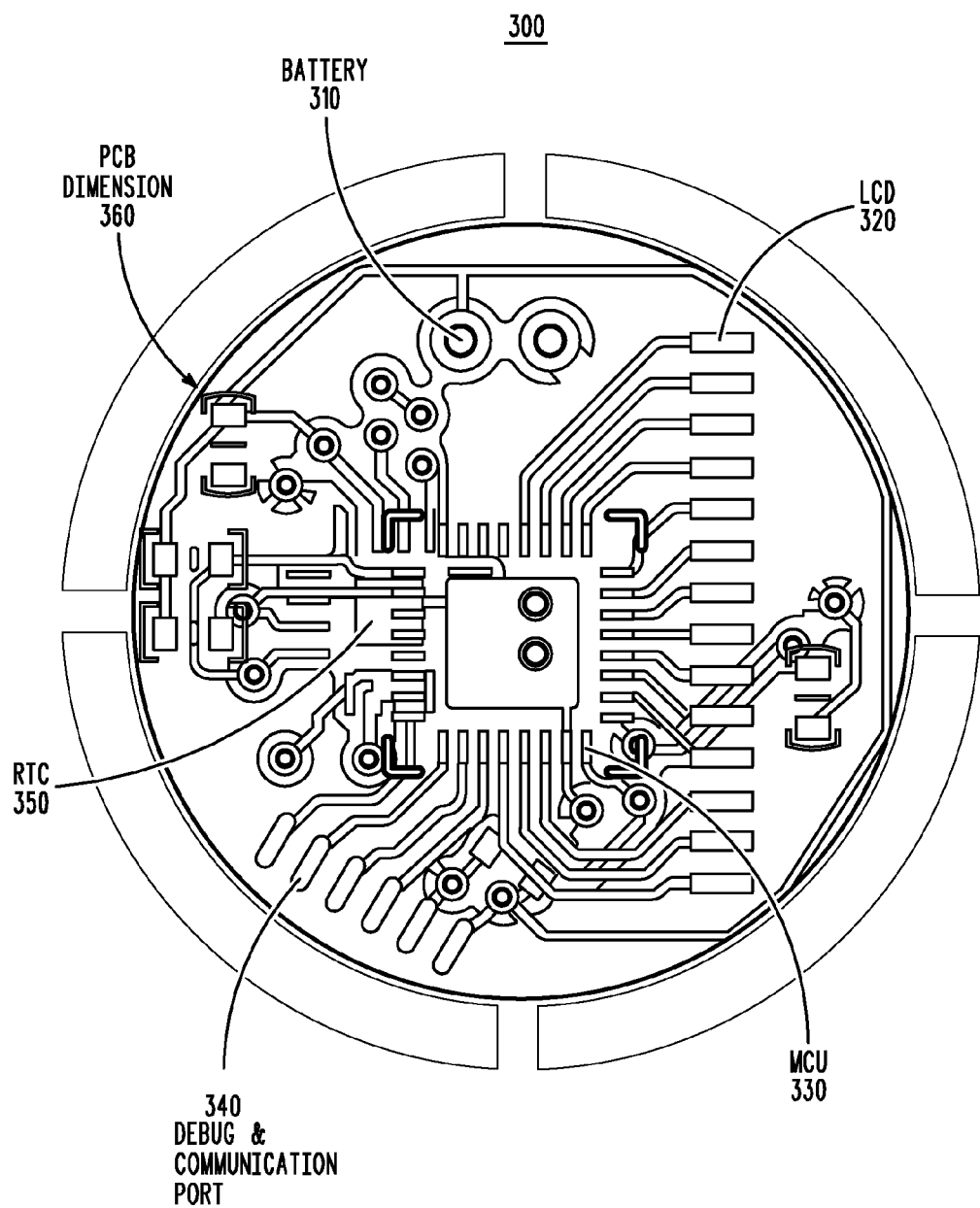
FIG. 3 is an exemplary chip layout in accordance with various representative embodiments.

The IRQ 190 and 290 of FIGS. 2 and 3, respectively, can wake up the transmit and controller elements (such as the RF transmitter and MCU, for example) to transmit data based on a set period to an external data reader. The external data reader can then send a confirming message to the transmitter/receiver that the data has been received. Once this confirmation is received by the transmitter/receiver, the communication is finished, and then the RF transmitter and MCU may return into standby mode again.

FIG. 3 is an exemplary chip layout 300 in accordance with various representative embodiments. In this layout an exemplary placement of battery 310, LCD display 320, MCU controller 330, debug and communication port 340, RTC clock element 350, and PCB dimension 360 is shown. PCB dimension can vary depending on the process used, but may be 7.5 mm or 10 mm, for example.

Figure 4:
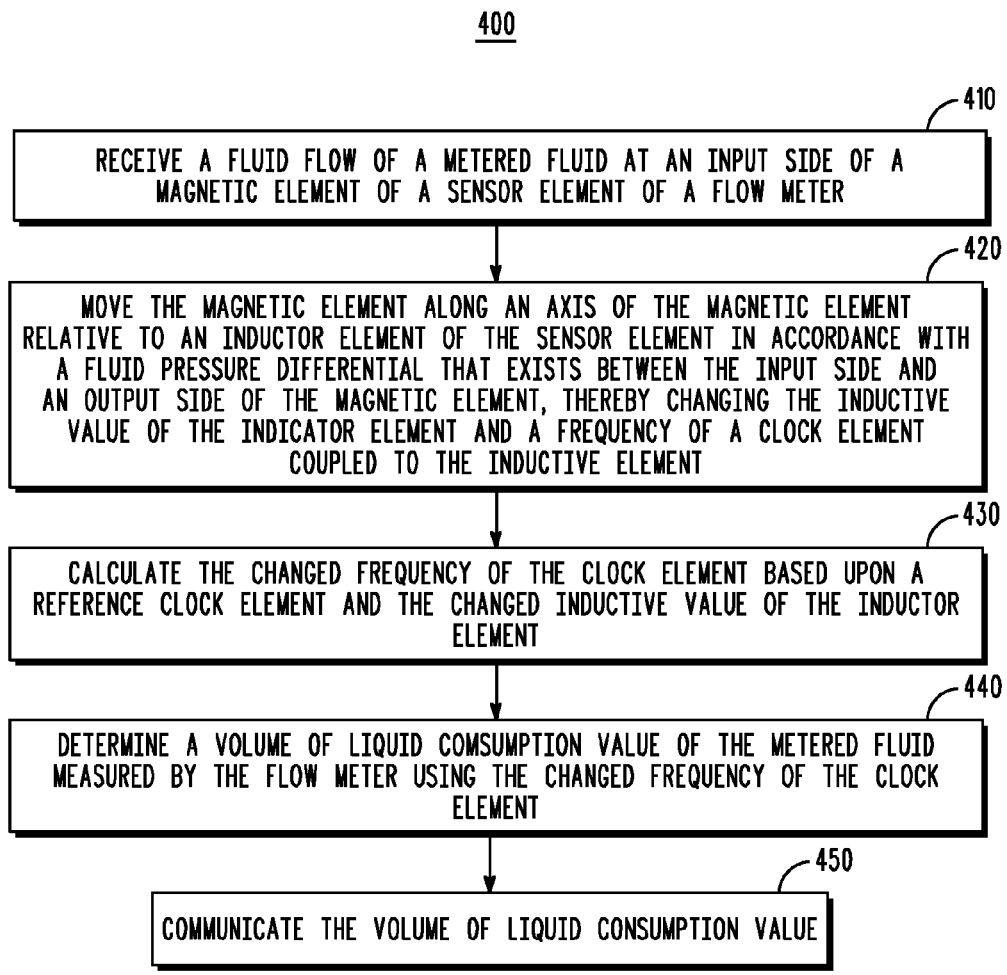
FIG. 4 is a flowchart of metered fluid flow measurement in accordance with various representative embodiments.

Referring now to FIG. 4, a flow 400 of metered fluid flow measurement in accordance with various embodiments is illustrated. In Block 410, a fluid flow of a metered fluid is received at an input side of a magnetic element of a sensor element of a flow meter. The magnetic element moves along an axis of the magnetic element relative to an inductor element of the sensor element in accordance with a fluid pressure differential that exists between the input side and an output side of the magnetic element, thereby changing the inductive value of the inductor element and a frequency of a clock element coupled to the inductive element at Block 420. At Block 430, the changed frequency of the clock element is calculated based upon a reference clock element and the changed inductive value of the inductor element. A volume of liquid consumption value of the metered fluid measured by the flow meter is determined using the changed frequency of the clock element at Block 440. This volume of liquid consumption value is communicated at Block 450.

Communicating the volume of liquid consumption value may include transmitting the volume of liquid consumption value to a data reader external the flow meter. Transmitting the volume of liquid consumption value to a data reader external the flow meter may be controlled by an interrupt request signal of the reference clock element. In certain embodiments, then, communicating the volume of liquid consumption value comprises the reference clock element generating an interrupt request signal; a controller element of the flow meter receiving the interrupt request signal; and the controller element controlling a transmit element to transmit the volume of liquid consumption value to a data reader external the flow meter. The reference clock element may generate the interrupt request signal periodically.

Communicating the volume of liquid consumption value may also include displaying the volume of liquid consumption value on a display element of the flow meter. As previously discussed and illustrated, the display element may be a LCD or other display element.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A flow meter, comprising:
   a sensor element that receives a flow input of a metered fluid and outputs a flow output of the metered fluid, wherein the sensor element comprises:
   an inductor element;
   a magnetic element coupled to the inductor element;
   a battery element that powers the flow meter;
   a reference clock element coupled to the sensor element;
   a clock element coupled to the inductor element; and
   a controller element coupled to the reference clock element and the clock element;
   wherein in response to movement of the magnetic element relative to the inductor element caused by a fluid pressure differential of the metered fluid, the inductive value of the inductor element of the sensor changes and the controller element calculates a changed frequency of the clock element based upon the reference clock element and the changed inductive value of the inductor element caused by movement of the magnetic element relative to the inductor element and wherein the changed frequency of the clock element is representative of a volume of liquid consumption value of the metered fluid measured by the flow meter.

2. The flow meter of claim 1, wherein the reference clock element and the clock element are coupled to the controller element by first and second serial computer buses and wherein the controller element communicates the volume of liquid consumption value of the metered fluid via a serial peripheral interface.

3. The flow meter of claim 2, wherein the first and second serial buses are inter-integrated circuit (IIC) buses.

4. The flow meter of claim 1, wherein the flow meter further comprises:
   a transmitter element controlled by the controller element; and
   an interrupt request feature of the reference clock element, wherein the interrupt request feature of the reference clock element causes the controller element to control the transmitter element of the flow meter to transmit the volume of liquid consumption value of the metered fluid.

5. The flow meter of claim 4, wherein the transmitter element is a radio frequency (RF) transmitter element.

6. The flow meter of claim 4, wherein the interrupt request feature of the reference clock element causes the controller element to control the transmitter element to transmit the volume of liquid consumption value of the metered fluid at predetermined intervals of time.

7. The flow meter of claim 6, wherein the transmitter element and the controller element go into a standby mode upon receipt of a confirmation message by the transmitter element that the consumption value of the metered fluid is received.

8. The flow meter of claim 1, the flow meter further comprising a display element coupled to the controller element, wherein the consumption value of the metered fluid is displayed on the display element of the flow meter.

9. The flow meter of claim 8, wherein the display element is a liquid crystal display.

10. The flow meter of claim 1, wherein the inductor element is coupled in series with the clock element.

11. The flow meter of claim 1, wherein the controller element is a microcontroller element.

12. A flow meter, comprising:
    a sensor element that receives a flow input of a metered fluid and outputs a flow output of the metered fluid, wherein the sensor element comprises:
    an inductor element;
    a magnetic element coupled to the inductor element; and
    a battery element that powers the flow meter;
    wherein in response to movement of the magnetic element relative to the inductor element caused by a fluid pressure differential of the metered fluid, the inductive value of the inductor element of the sensor changes and
    wherein the magnetic element is a magnetic cone element.

13. A flow meter, comprising:
    a sensor element that receives a flow input of a metered fluid and outputs a flow output of the metered fluid, wherein the sensor element comprises:
    an inductor element;
    a magnetic element coupled to the inductor element; and
    a battery element that powers the flow meter;
    wherein in response to movement of the magnetic element relative to the inductor element caused by a fluid pressure differential of the metered fluid, the inductive value of the inductor element of the sensor changes and
    wherein the fluid pressure differential of the metered fluid that causes movement of the magnetic element exists between an input side of the magnetic element and an output side of the magnetic element.

14. A flow meter, comprising:
    a sensor element that receives a flow input of a metered fluid and outputs a flow output of the metered fluid, wherein the sensor element comprises:
    an inductor element;
    a magnetic element coupled to the inductor element; and
    a battery element that powers the flow meter;
    wherein in response to movement of the magnetic element relative to the inductor element caused by a fluid pressure differential of the metered fluid, the inductive value of the inductor element of the sensor changes and
    wherein the metered fluid is one of gas and water.

15. A method of measuring consumption of a fluid, comprising:
    receiving a fluid flow of a metered fluid at an input side of a magnetic element of a sensor element of a flow meter;
    moving the magnetic element along an axis of the magnetic element relative to an inductor element of the sensor element in accordance with a fluid pressure differential that exists between the input side and an output side of the magnetic element, wherein moving the magnetic element relative to the inductor element changes the inductive value of the inductor element and a frequency of a clock element coupled to the inductor element;
    calculating the changed frequency of the clock element based upon a reference clock element and the changed inductive value of the inductor element;
    determining a volume of liquid consumption value of the metered fluid measured by the flow meter using the changed frequency of the clock element; and
    communicating the volume of liquid consumption value.

16. The method of claim 15, wherein communicating the volume of liquid consumption value comprises displaying the volume of liquid consumption value on a display element of the flow meter.

17. The method of claim 15, wherein communicating the volume of liquid consumption value comprises transmitting the volume of liquid consumption value to a data reader external the flow meter.

18. The method of claim 17, wherein transmitting the volume of liquid consumption value to a data reader external the flow meter is controlled by an interrupt request signal of the reference clock element.

19. The method of claim 15, wherein communicating the volume of liquid consumption value further comprises:
- the reference clock element generating an interrupt request signal;
- a controller element of the flow meter receiving the interrupt request signal; and
- the controller element controlling a transmit element to transmit the volume of liquid consumption value to a data reader external the flow meter.

20. The method of claim 19, further comprising the reference clock element generating the interrupt request signal periodically.

* * * * *